United States Patent
Vignes et al.

(10) Patent No.: US 9,635,838 B2
(45) Date of Patent: May 2, 2017

(54) MODULAR LIVESTOCK FLUID DISPENSING APPARATUS AND SYSTEM

(71) Applicant: Advanced Birthright Nutrition Inc., Apple Valley, MN (US)

(72) Inventors: John L. Vignes, Apple Valley, MN (US); Justin J. Vignes, St. Louis Park, MN (US)

(73) Assignee: Advanced Birthright Nutrition Inc., Apple Valley, MN (US)

( * ) Notice: Subject to any disclaimer, the term of this patent is extended or adjusted under 35 U.S.C. 154(b) by 57 days.

(21) Appl. No.: 14/494,745

(22) Filed: Sep. 24, 2014

(65) Prior Publication Data

US 2015/0083049 A1    Mar. 26, 2015

Related U.S. Application Data

(60) Provisional application No. 61/881,802, filed on Sep. 24, 2013.

(51) Int. Cl.
*A01K 39/02* (2006.01)
*A01K 7/06* (2006.01)

(52) U.S. Cl.
CPC .......... *A01K 39/0213* (2013.01); *A01K 7/06* (2013.01)

(58) Field of Classification Search
CPC ....... A01K 39/0213; A01K 7/06; A01K 7/022
See application file for complete search history.

(56) References Cited

U.S. PATENT DOCUMENTS

| 2,678,630 | A | * | 5/1954 | Frederiksen | A01K 7/06 |
| | | | | | 119/72.5 |
| 3,550,560 | A | | 12/1970 | Edstrom | |
| 3,563,264 | A | | 2/1971 | Boegli et al. | |
| 4,307,682 | A | * | 12/1981 | Bollman | A01K 39/02 |
| | | | | | 119/75 |

(Continued)

FOREIGN PATENT DOCUMENTS

EP    0508930 A2    10/1992

OTHER PUBLICATIONS

Extended European Search Report for European Application No. 14186175.7 dated Apr. 13, 2015, 10 pages.

*Primary Examiner* — Monica Williams
*Assistant Examiner* — Jessica Wong
(74) *Attorney, Agent, or Firm* — Billion & Armitage; Benjamin C. Armitage

(57) ABSTRACT

The present inventions relate to apparatus and systems for feeding livestock, particularly to nipple-actuated feeding stations which include a nipple insert assembly having an internal valve system actuable by a nipple and insertable into an insert assembly having a normally-closed internal valve system and connectible to a pressurized feed line. Inserting the nipple assembly into the insert assembly opens the insert assembly valve system and subsequent nipple actuation discharges fluid from the pressurized feed line. The nipple assembly may be removed from the insert assembly without depressurizing the feed line or manipulating other process conditions. A plurality of insert assembly and nipple assembly pairings may be positioned throughout one or more pressurized feed lines to form a feeding system, and the flow rates of each individual feeding station may be manually or automatically controlled.

19 Claims, 13 Drawing Sheets

(56) References Cited

U.S. PATENT DOCUMENTS

| | | | |
|---|---|---|---|
| 4,637,345 A * | 1/1987 | Hostetler | A01K 39/0213 119/72.5 |
| 4,779,571 A | 10/1988 | Row | |
| 6,058,881 A * | 5/2000 | Thompson | A01K 39/0213 119/72.5 |
| 6,981,469 B1 | 1/2006 | Welbourne | |
| 8,166,917 B2 | 5/2012 | Welbourne | |

* cited by examiner

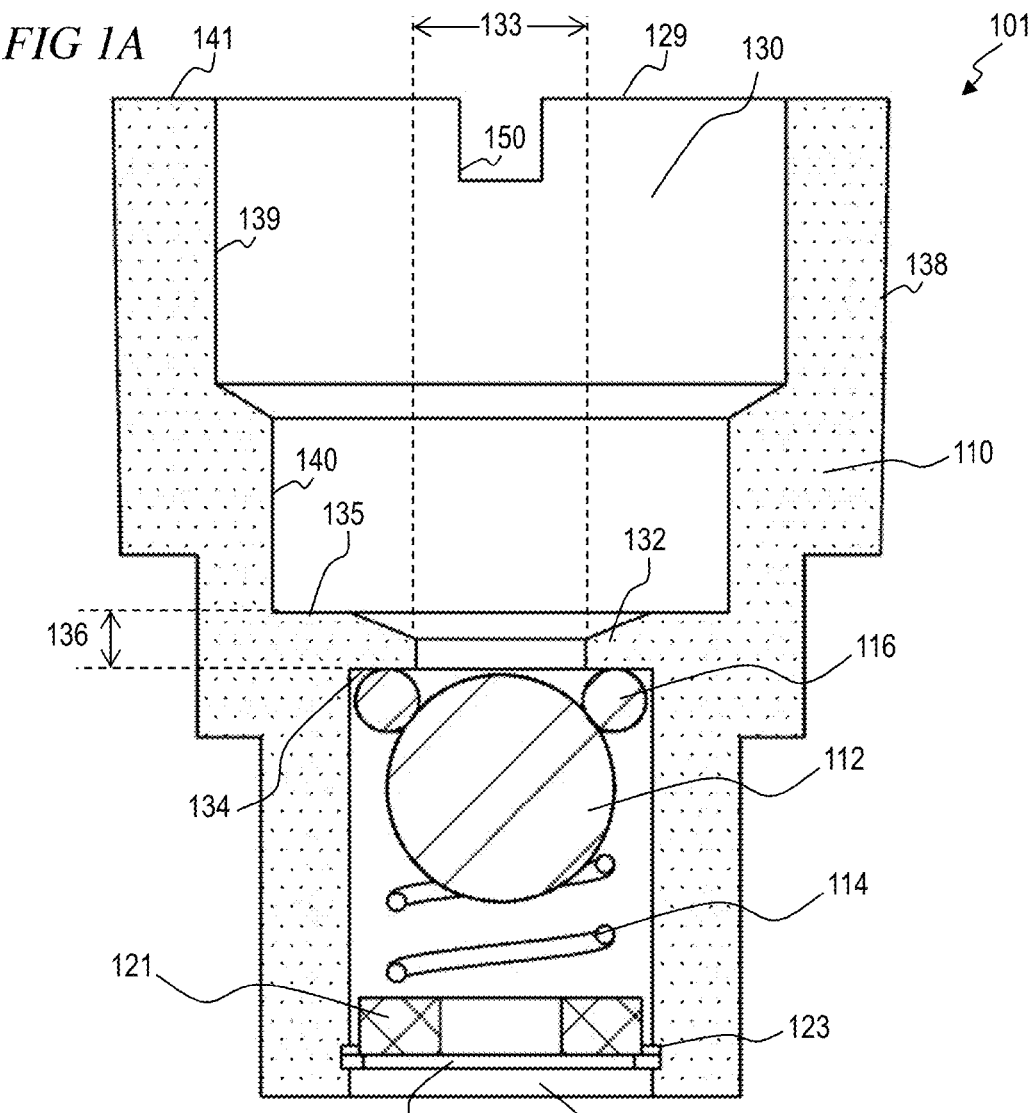
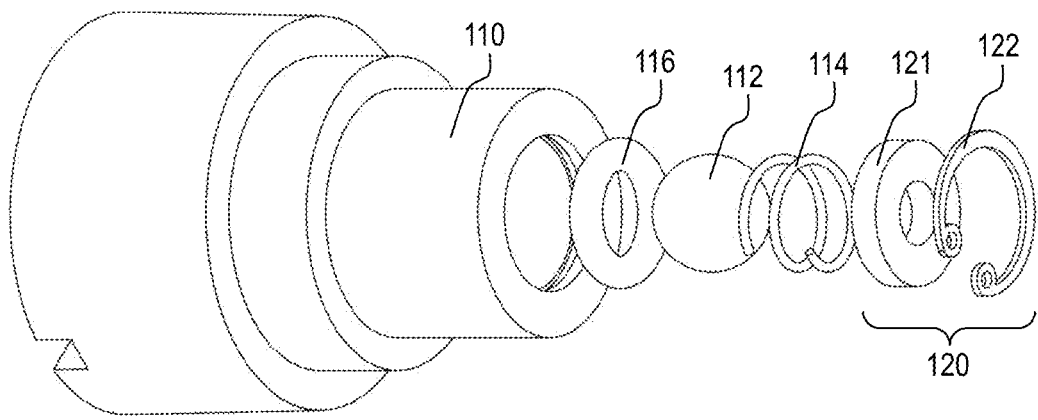

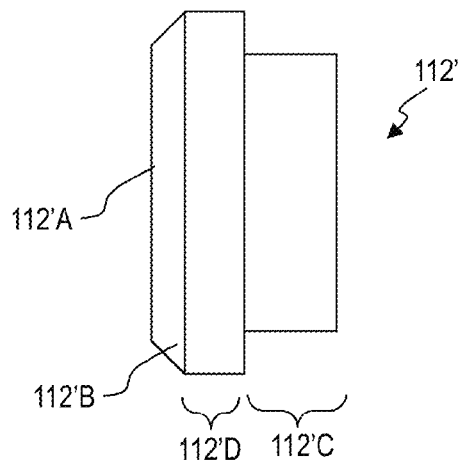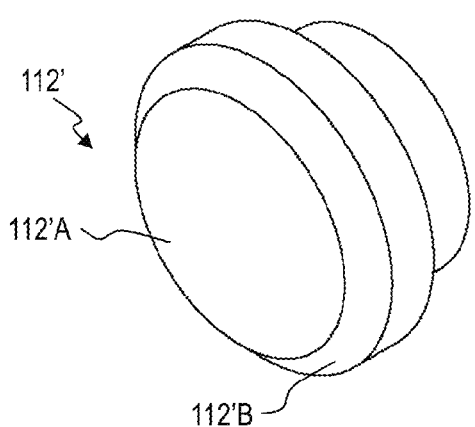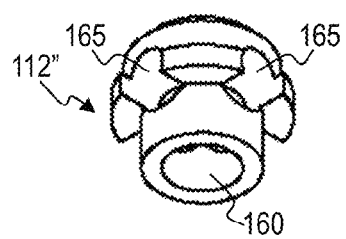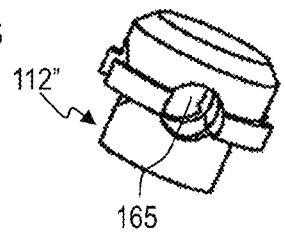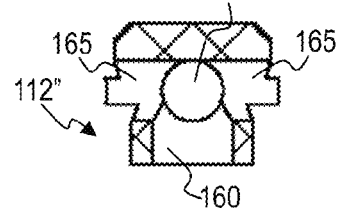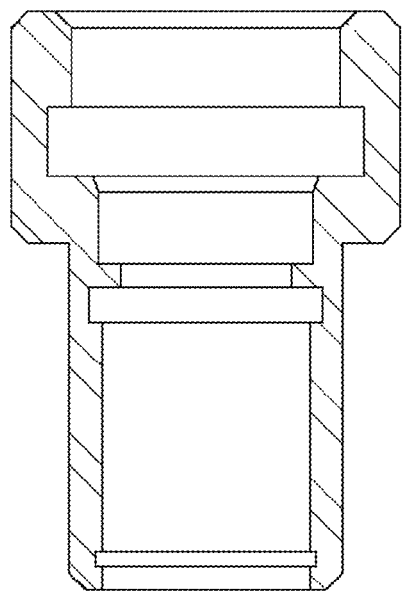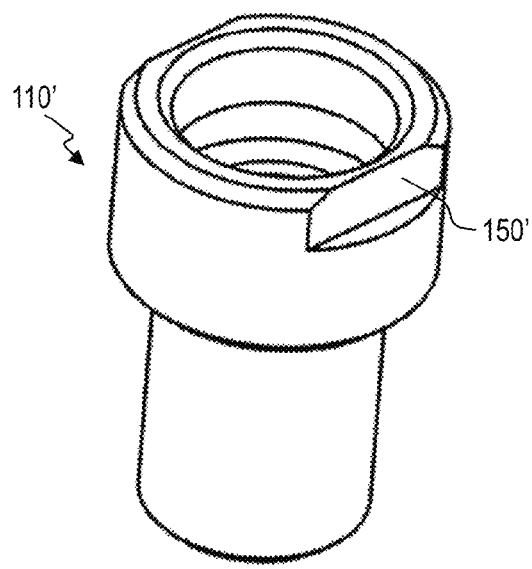

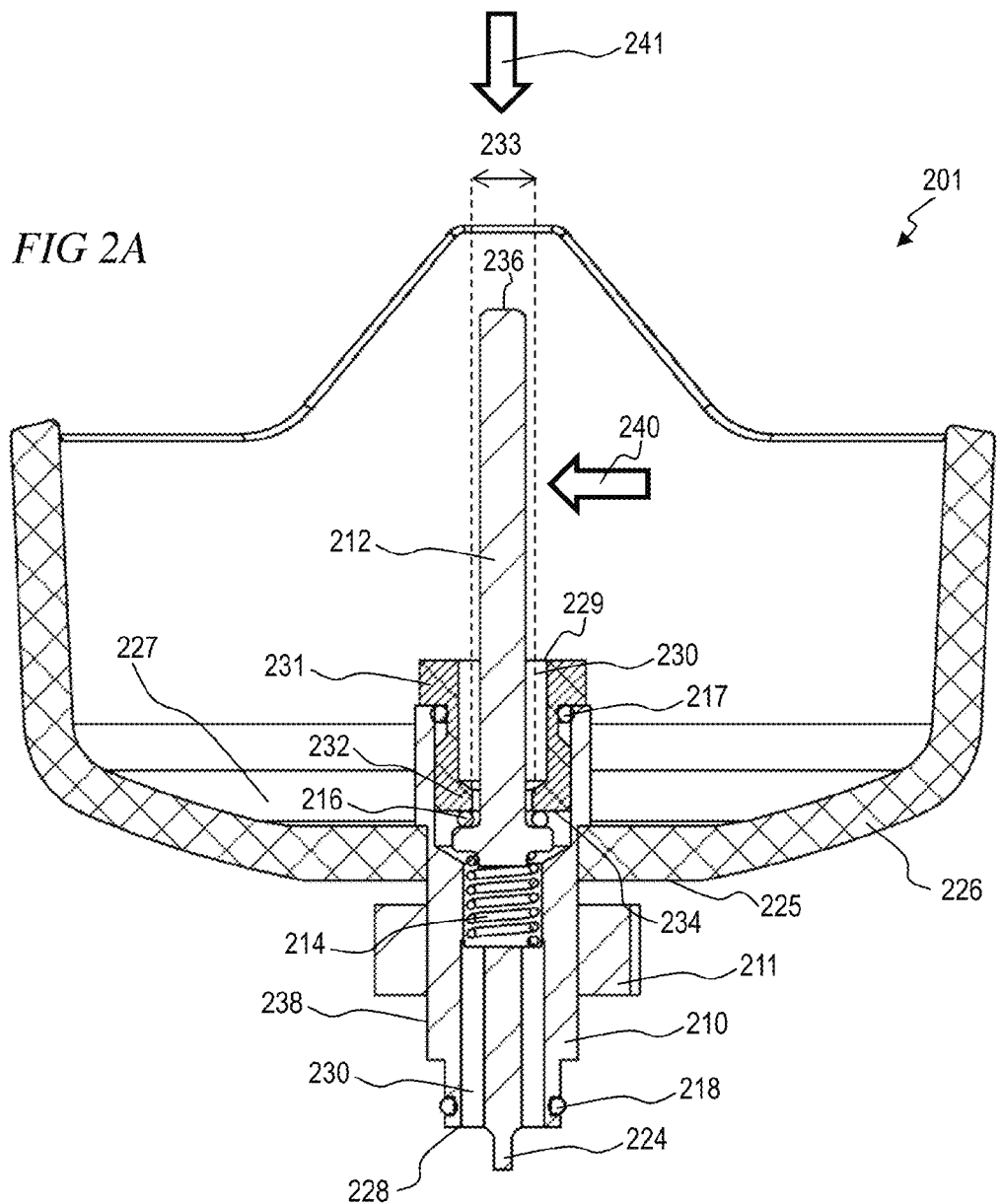
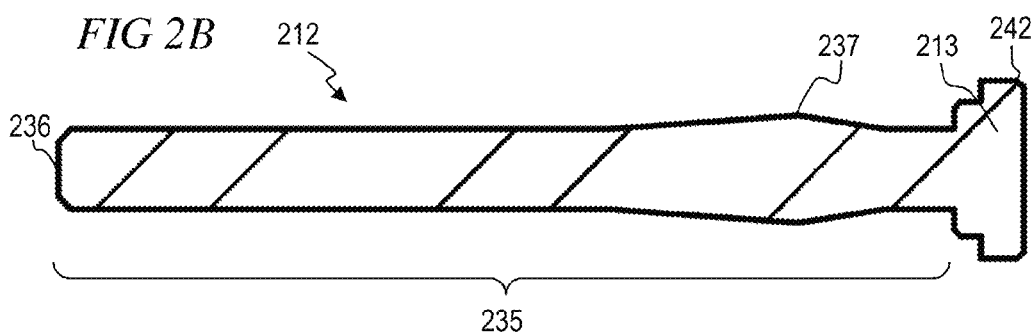

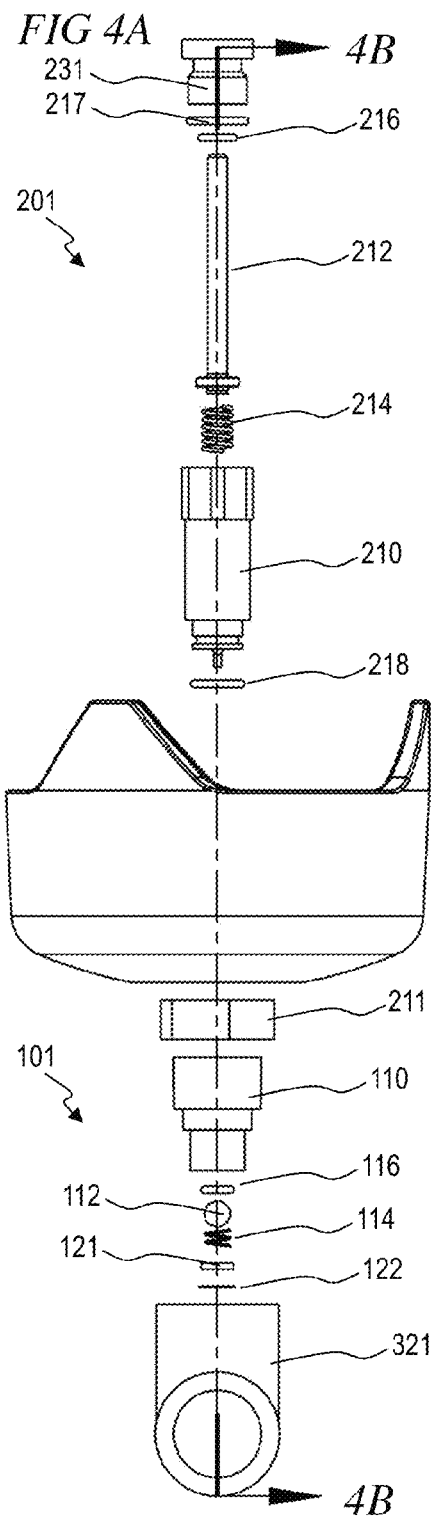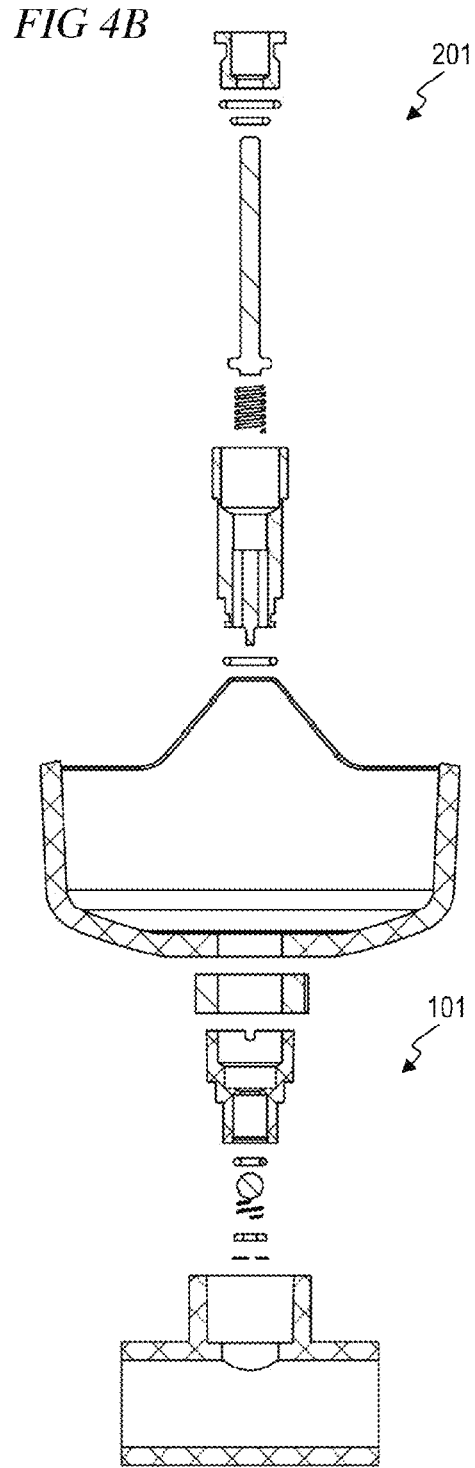

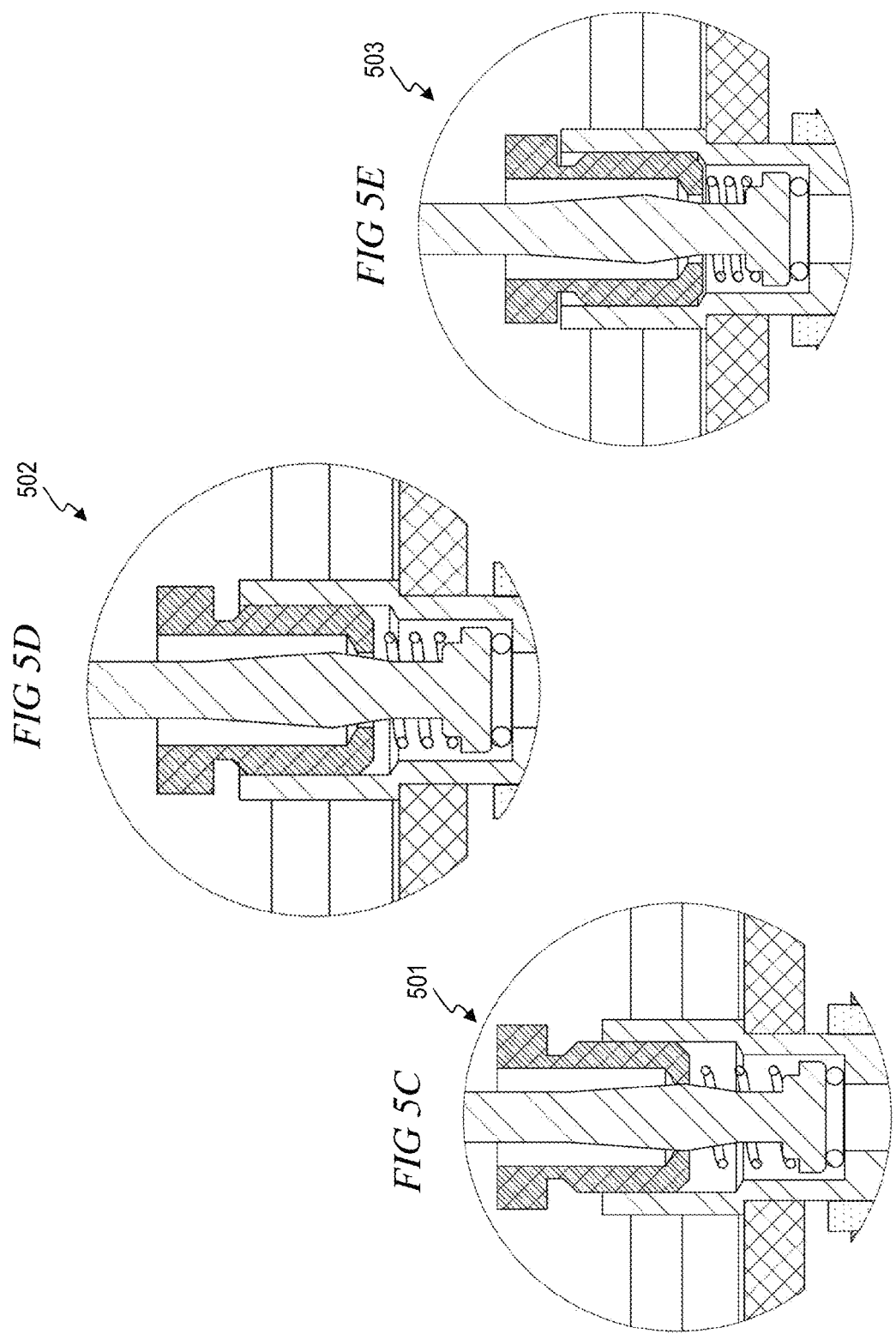

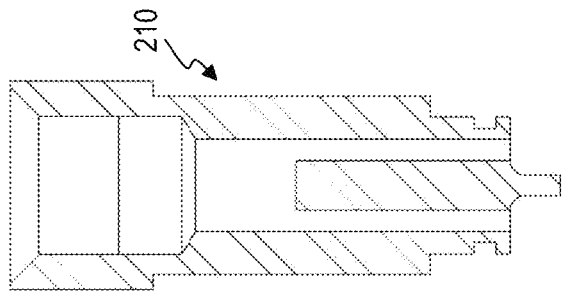
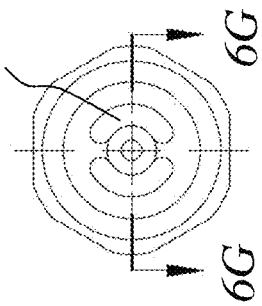
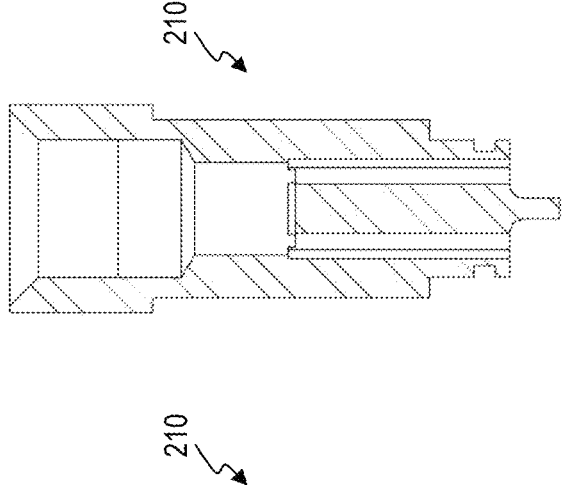
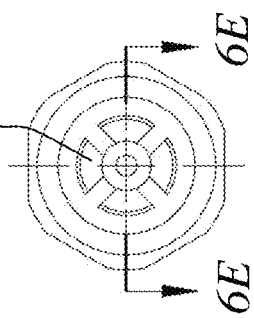
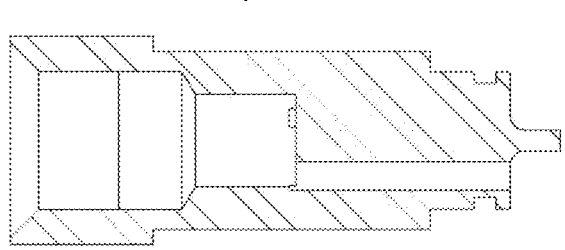
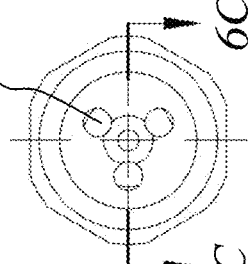
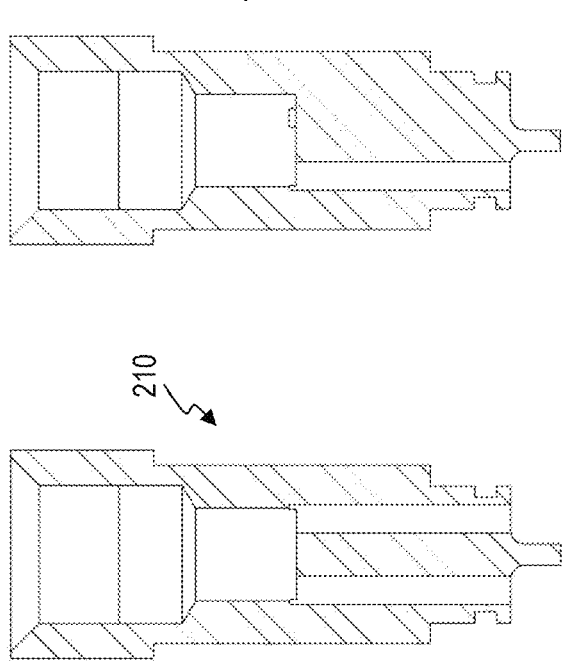
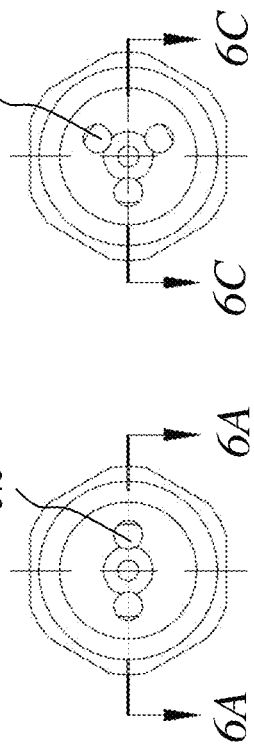

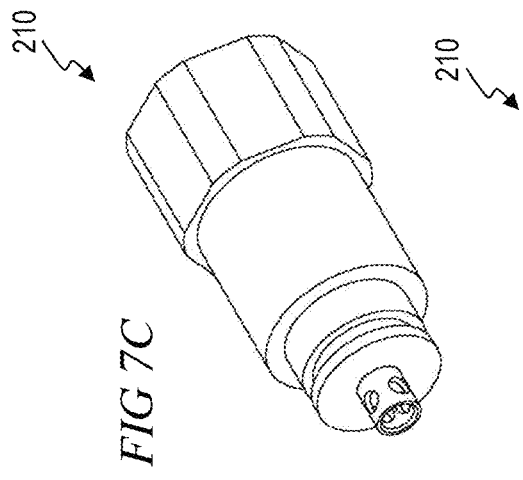
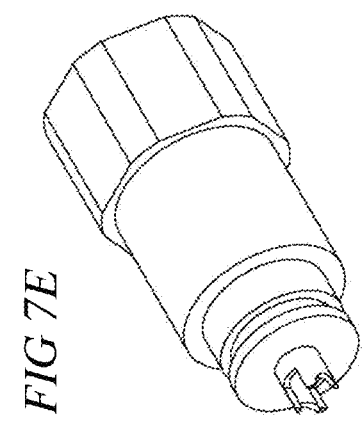
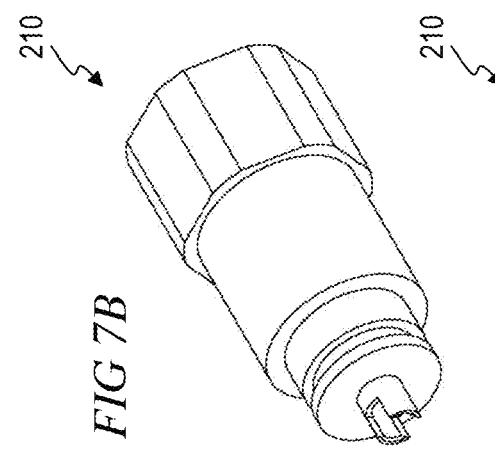
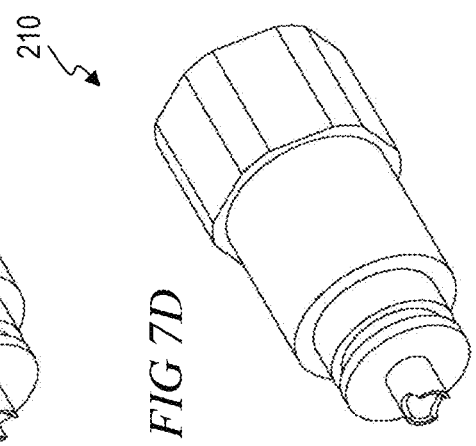
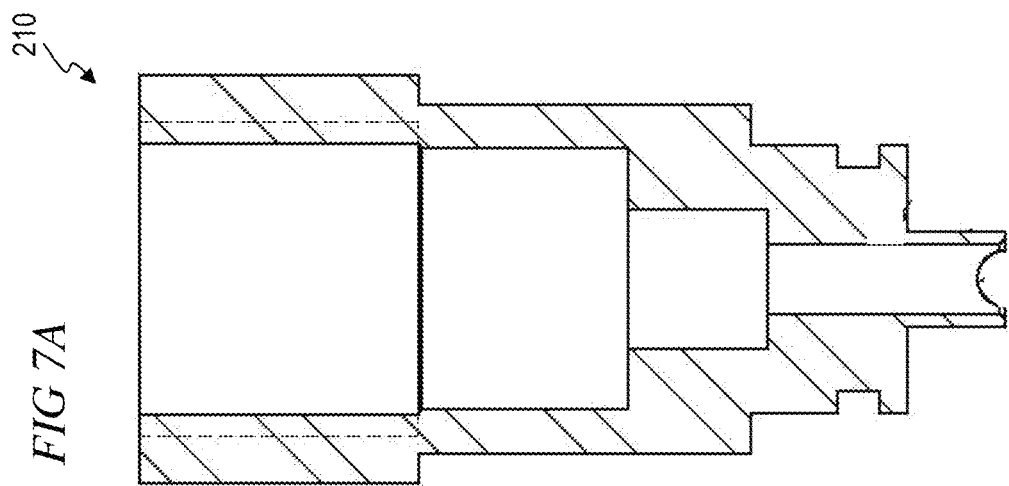

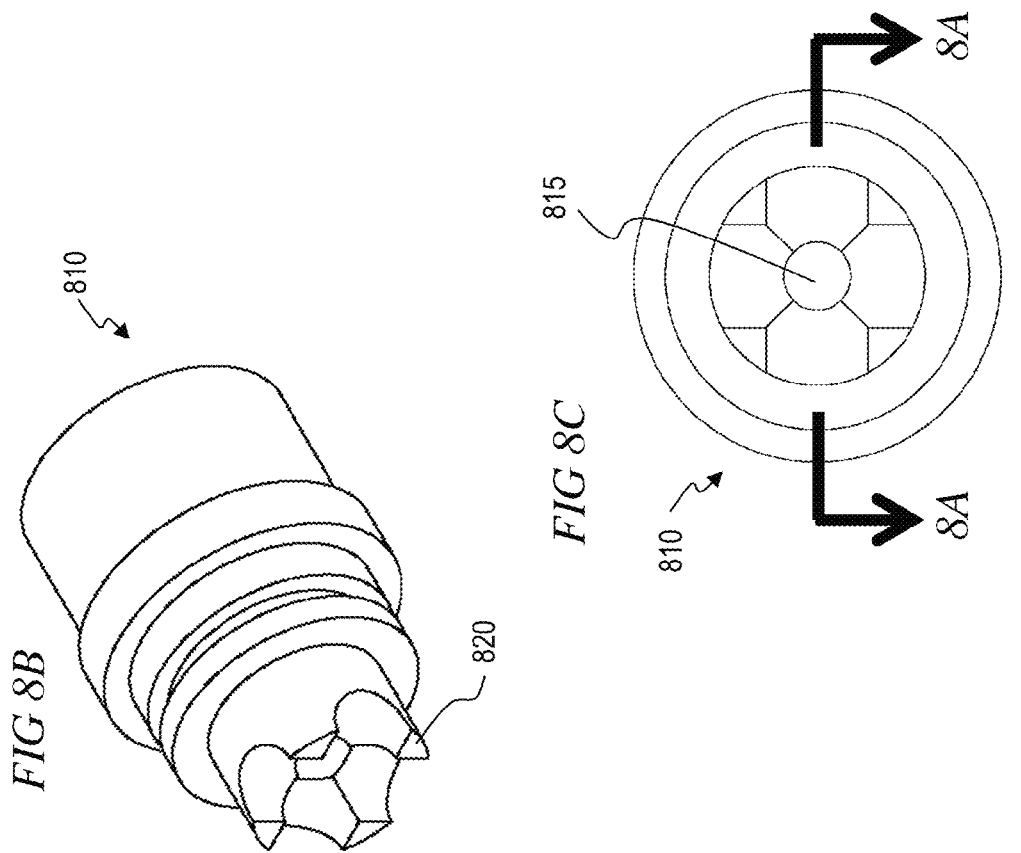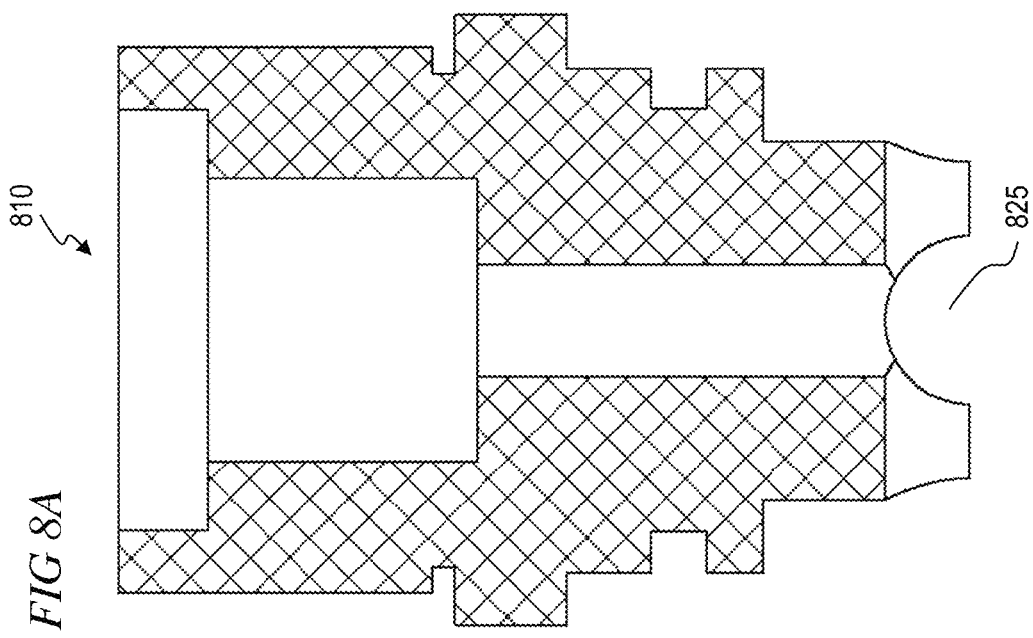

MODULAR LIVESTOCK FLUID DISPENSING APPARATUS AND SYSTEM

CROSS-REFERENCE TO RELATED APPLICATION(S)

This application claims the benefit under 35 U.S.C 119(e) of U.S. Provisional Application No. 61/881,802, filed on Sep. 24, 2013; the full disclosure of which is incorporated herein by reference in its entirety.

BACKGROUND

Typical livestock feeding apparatus and systems include one or many feeding stations attached to a pressurized feed line. Such feeding stations often must be removed due to general wear and tear, clogging caused by liquid feed blends having higher viscosities or solid particulate content, or any number of sanitary concerns germane to raising livestock. Some apparatus and systems are not manually operable by the feeding animals, and require an operator to pressurize the line, open a valve to allow feed to flow into the feeding stations, or a combination thereof. These tasks must be performed each feeding iteration, thereby increasing operational requirements and task management complexity for the facility staff.

Other apparatus and systems are manually operable by the feeding animals, but are not easily detachable from the feed line to allow for easy inspection, maintenance, or cleaning. When a malfunction or sanitary hazard necessitates removal of one or more feeding stations, facility operation is disrupted because the entire pressurized feed line must be depressurized to remove one or more problem feeding units. Often, the procedures for depressurizing the feed line and removing malfunctioning or unsanitary feeding stations are so detrimental to operational efficiency that the unusable feeding units are capped and left in place in their unusable state. Livestock then must either be inefficiently fed in smaller groups, or standard feeding group sizes are maintained at the risk of underfeeding livestock due to the increased animal to feeding station ratio. Many facilities are designed with a feeding station present in each stall or pen, and simply cannot operate with unusable feeding stations. As a result, lengthy and inefficient line depressurization and feeding station replacement procedures must be undergone each time a single feeding station malfunctions or manifests a sanitary concern.

Livestock utilizing such feeding stations are of diverse species, all of which are inherently prone to growth and changing nutritional intake needs. When a plurality of animals feed from feeding stations located on the same feed line, feeding station flow rate parameters must be customized per each feeding animal's species, size, and nutritional requirements. Or, stalls built with individual feeding stations must be reconfigured when stalls are repurposed for use by an animal or animals of different size or species. This will require facilities to purchase and install several different types of feeding stations

SUMMARY

Apparatus and methods in accordance with the present inventions may resolve many of the needs and shortcomings discussed above and may provide additional improvements and advantages that may be recognized by those skilled in the art upon review of the present disclosure.

The insert assembly includes a body, a sealing means, and a stopping means. The insert assembly body defines a fluid passageway having an outlet end and an inlet end, and the stopping means extends inward within the fluid passageway between the inlet and outlet ends. An O-ring can be sealingly in contact with the stopping means facing the inlet end, and creates a liquid-tight seal when in contact with the sealing sphere. The sealing means is forced into sealing contact with the O-ring or stopping means by line pressure or a compressible member, which can be maintained within the fluid passageway by a retaining means located proximate to the inlet end of the body. The nipple assembly includes a body, a cup, an nipple, and a retaining means. The nipple assembly body defines a fluid passageway having an outlet end and an inlet end, and includes stopping means which extends inward within the fluid passageway between the inlet and outlet ends, and one or more tips which extends beyond the outlet end. An O-ring can be sealingly in contact with the annular shoulder facing the inlet end. The nipple includes an elongated stem with a base, the elongated stem extending towards the outlet end through the passeway formed by the annular shoulder and the base located between the O-ring and inlet end. Line pressure or a compressible member can force the nipple stem into sealing contact with the O-ring or stopping means. A retaining means located between annular shoulder and the inlet end of the body can maintain the compressible spring within the fluid passageway. The cup attaches to the outside of the body between the inlet end and outlet end, and is concave up towards the outlet end.

The insert assemble may be mechanically attached to the pressurized feed line at a T-junction, or may be a permanent fixture of the line. When the insert assembly inlet end is in fluid communication with the pressurized feed line, the internal valve system of the insert assembly prevents discharge of the pressurized line fluid. The outlet end of the insert assembly is able to accept the inlet end of the nipple assembly, which causes the nipple assembly tip to contact and unseat the insert assembly sealing means into an open position. Fluid flow is then allowed through the fluid passageway of the insert assembly and into the inlet end of the nipple assembly. The internal valve system of the nipple assembly prevents discharge of the pressurized line fluid. Actuating the nipple unseats the nipple base and allows fluid flow through the fluid passageway of the nipple assembly and into the cup. Removing the nipple assembly from the insert assembly allows the sealing means to reseat into a closed position, preventing further fluid discharge. The depth to which the nipple assembly is inserted into the insert assembly may be manipulated so as to control liquid discharge flow rate.

Systems in accordance with aspects of the present invention may include attaching a plurality of insert assemblies to at least one pressurized feed line to create a series of feeding access points. Nipple assemblies may be coupled to corresponding insert assemblies, enabling a plurality of livestock to simultaneously feed. Any number of feeding stations may be removed for maintenance, cleaning, replacement, or to limit the number of available feeding stations. The internal valve system of the insert assembly allows such removals to be made while the feed line is pressurized and without disturbing feeding activity at other feeding stations.

Other features and advantages of the inventions will become apparent from the following detailed description, and from the claims.

BRIEF DESCRIPTION OF THE FIGURES

FIG. 1A illustrates a cross-sectional side view of an insert assembly, according to one or more embodiments;

FIG. 1B illustrates an exploded perspective view of an insert assembly, according to one or more embodiments;

FIG. 1C illustrates a side view of a sealing means, according to one or more embodiments;

FIG. 1D illustrates a perspective view of a sealing means, according to one or more embodiments;

FIG. 1E illustrates a perspective view of a sealing means, according to one or more embodiments;

FIG. 1F illustrates a perspective view of a sealing means, according to one or more embodiments;

FIG. 1G illustrates a cross-sectional view of a sealing means, according to one or more embodiments;

FIG. 1H illustrates a cross-sectional view of an insert assembly body, according to one or more embodiments;

FIG. 1I illustrates a perspective view of an insert assembly body, according to one or more embodiments;

FIG. 2A illustrates a cross-sectional side view of a nipple insert assembly, according to one or more embodiments;

FIG. 2B illustrates a side view of a tapered nipple, according to one or more embodiments;

FIG. 4A illustrates an exploded side view of a complete feeding station, according to one or more embodiments ntions generally corresponding to the embodiment illustrated in FIG. 3A;

FIG. 4B illustrates an exploded cross-sectional side view of a complete feeding station, according to one or more embodiments generally corresponding to the embodiment illustrated in FIG. 3A;

FIG. 5C illustrates a cross-sectional cutaway side view of a nipple assembly as depicted in FIG. 5B wherein the nipple retaining means acts as a nipple motion restrictor and is in a closed position, according to one or more embodiments;

FIG. 5D illustrates a cross-sectional cutaway side view of a nipple assembly as depicted in FIG. 5B wherein the nipple retaining means acts as a nipple motion restrictor and is in a partially-open position, according to one or more embodiments inventions;

FIG. 5E illustrates a cross-sectional cutaway side view of a nipple assembly as depicted in FIG. 5B wherein the nipple retaining means acts as a nipple motion restrictor and is in a fully-open position, according to one or more embodiments;

FIG. 6A illustrates a cross-sectional side view of a nipple assembly body, according to one or more embodiments generally corresponding to the embodiment illustrated in FIG. 6B;

FIG. 6B illustrates a bottom view of a nipple assembly body, according to one or more embodiments generally corresponding to the embodiment illustrated in FIG. 6A;

FIG. 6C illustrates a cross-sectional side view of a nipple assembly body, according to one or more embodiments generally corresponding to the embodiment illustrated in FIG. 6D;

FIG. 6D illustrates a bottom view of a nipple assembly body, according to one or more embodiments generally corresponding to the embodiment illustrated in FIG. 6C;

FIG. 6E illustrates a cross-sectional side view of a nipple assembly body, according to one or more embodiments generally corresponding to the embodiment illustrated in FIG. 6F;

FIG. 6F illustrates a bottom view of a nipple assembly body, according to one or more embodiments generally corresponding to the embodiment illustrated in FIG. 6E;

FIG. 6G illustrates a cross-sectional side view of a nipple assembly body, according to one or more embodiments generally corresponding to the embodiment illustrated in FIG. 6H;

FIG. 6H illustrates a bottom view of a nipple assembly body, according to one or more embodiments generally corresponding to the embodiment illustrated in FIG. 6G;

FIG. 7A illustrates a cross-sectional side view of a nipple assembly body, according to one or more embodiments generally corresponding to the embodiments illustrated in FIGS. 7B-E;

FIG. 7B illustrates a perspective view of a nipple assembly body, according to one or more embodiments generally corresponding to the embodiment illustrated in FIG. 7A;

FIG. 7C illustrates a perspective view of a nipple assembly body, according to one or more embodiments generally corresponding to the embodiment illustrated in FIG. 7A;

FIG. 7D illustrates a perspective view of a nipple assembly body, according to one or more embodiments generally corresponding to the embodiment illustrated in FIG. 7A;

FIG. 7E illustrates a perspective view of a nipple assembly body, according to one or more embodiments generally corresponding to the embodiment illustrated in FIG. 7A;

FIG. 8A illustrates a cross-sectional view of a nipple assembly body, according to one or more embodiments;

FIG. 8B illustrates a perspective view of a nipple assembly body, according to one or more embodiments;

FIG. 8C illustrates a bottom view of a nipple assembly body, according to one or more embodiments;

Figure 3A:
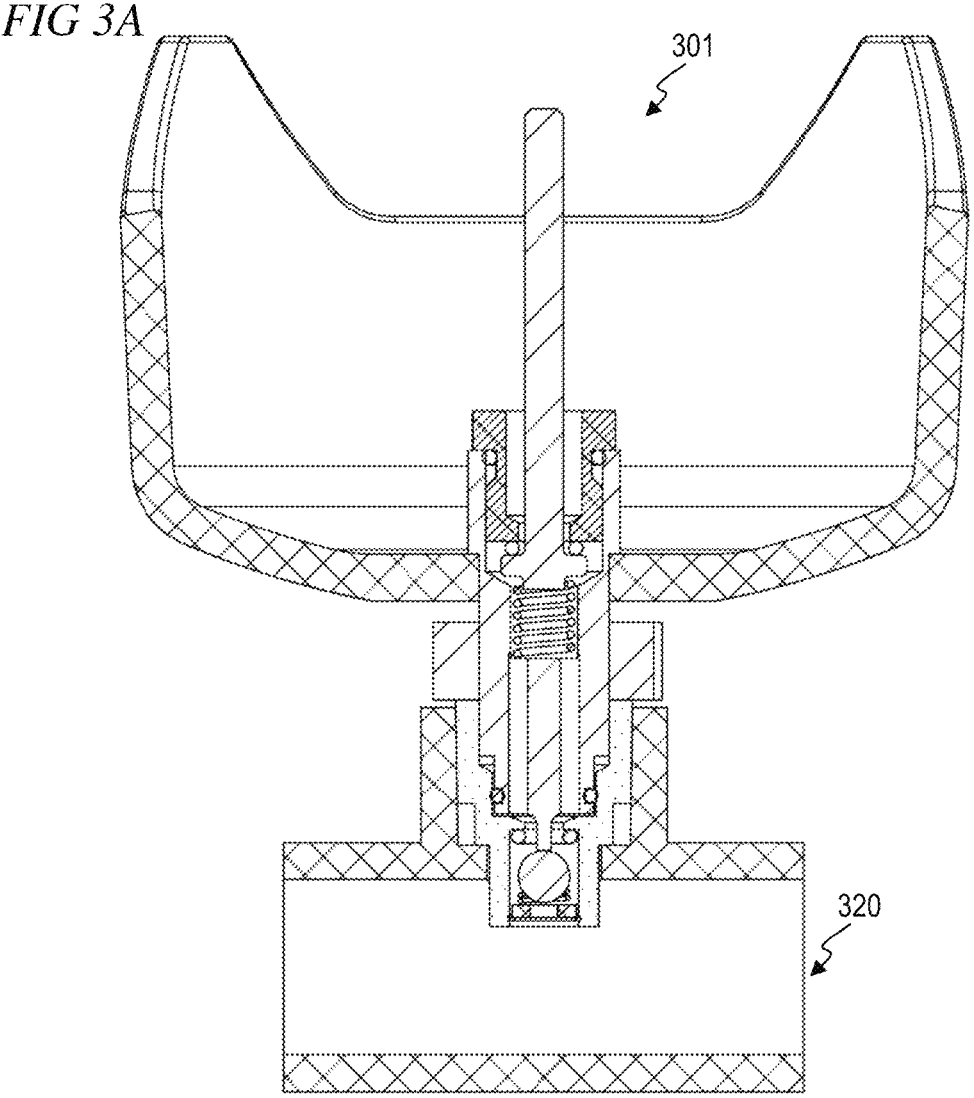
FIG. 3A illustrates a cross-sectional side view of an insert assembly attached to a T-junction of a pressurized line and coupled with a nipple insert to form a complete feeding station, according to one or more embodiments.

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the dimensions and dimensional proportions to conform to specific force, weight, strength, and similar requirements for various applications will likewise be within the skill of the art after the following description has been read and understood. In some Figures, elements for one or more embodiments may be omitted for clarity.

DETAILED DESCRIPTION OF THE INVENTION

Although the quick couple apparatus and systems of the present invention is particularly well adapted for use in feeding livestock, it should become evident from the following discussion, that it is equally well suited for use in a wide variety of devices and is not necessarily limited to the particular embodiments shown herein.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

The present invention provides, in some embodiments, a modular quick connect-disconnect livestock feed dispensing apparatus that includes a nipple assembly and an insert assembly attachable to a pressurized feed line and capable of receiving the nipple assembly. Both the insert assembly and nipple assembly contain normally-closed internal valve systems which prevent discharge from the pressurized feed line until actuated. Sufficient coupling of the nipple assembly to the insert creates a substantially leak-proof seal, establishes fluid communication between the pressurized feed line and the two assemblies, and opens the internal valve system of the insert assembly. The insertion depth of the nipple assembly into the insert assembly a may be adjusted to control fluid discharge flow rate. Actuating the nipple assembly nipple effects a fluid discharge from the pressurized feed line. The nipple assembly may be uncoupled from the insert assembly while the feed line is under pressure, causes the internal valve system of the insert assembly to reseat and substantially prevents any fluid discharge from the pressurized feed line. A nipple assembly when coupled to an insert assembly forms a feeding station, and many such apparatus may be attached to the same or several pressurized feed lines. Feed lines can comprise one or a plurality of diameters.

Pressurized feed lines can supply water, milk, gruel, or other fluidized products to one or more feeding stations. Pressurized feed lines and feeding stations can accommodate for fluids containing a particulate or solids fraction of up to about 5% solids content, up to about 10% solids content, up to about 15% solids content, up to about 20% solids content, up to about 25% solids content, up to about 30% solids content, or up to about 35% solids content. For example, gruel having a solids content 26% may be run through pressurized feed lines to one or more feeding stations. Such systems may accommodate fluids having higher solids content, depending on the inner system line diameter and operating pressure. In some instances, milk having about 13% solids content is run through the system at about 20 psi, although milk can also be run at different pressures, such as about 5 psi to about 35 psi, about 10 psi to about 30 psi, or about 15 psi to about 25 psi.

Pressurized line diameter can be varied based on operating pressure, operating flow rates, feed usage per average feeding cycle, type of feed, or other considerations. For example, a smaller line such as ⅜ inches may be used to minimize the amount of feed in the line to reduce spoiling of stagnant product within the line. Smaller lines may increase effectiveness of insulation in keeping the product at desired temperatures. Lines of standard sizes can be preferable for ease of construction and reducing costs. For example, lines may be ¼ inches in diameter, ⅜ inches in diameter, ½ inches in diameter, ⅝ inches in diameter, ¾ inches in diameter, ⅞ inches in diameter, 1 inch in diameter, or larger. For example, milk may be run through a line having a ½ inch diameter. Larger line sizes may be necessary to accommodate feed having high solids content.

Nipple assemblies, insert assemblies, and pressurized feed lines may be constructed from a variety of materials including stainless steel, and various polymeric and rubber materials such as PVC. Materials of construction are selected based on considerations such as strength, cost, ease of machining, sanitation, heat transfer properties, corrosion resistance and transparency. For example, parts which come in constant contact with feeding animals may be constructed from stainless steel for durability and also sanitation. In some cases, transparent lines are not preferable as sunlight could exacerbate spoiling of the feed contained within. In other cases, transparent lines are helpful in identifying clogs or the feed product contained within. O-rings or sealing members may be constructed from plastics and rubbers based on elastic properties, or a materials ability to effectively seal in a wide range of conditions such as changes in ambient temperature and the differential between ambient temperatures and feed temperatures.

Advantages of the present invention will be readily apparent to one skilled in the relevant arts. The livestock-actuable nipple allows livestock to feed at-will, without requiring an operator to open valves or otherwise engage system feed dispensing means when livestock exhibit signs of hunger or thirst. Such livestock-actuated feeding systems also reduce waste by only dispensing feed when actuated by livestock, rather than by the "fill-the-trough" feeding method. This method contains unused feed within the apparatus and feed lines, and slows or prevents spoiling. The feed lines may be insulated, cooled, heated, or refrigerated.

Further, any nipple assembly may be uncoupled from its corresponding nipple assembly without detrimentally impacting the feed dispensing capabilities of any other feed dispensing apparatus or requiring feed line depressurization. Whether necessitated by apparatus malfunction, sanitary concerns, apparatus inspection schedules, maintenance routines, or otherwise, nipple assemblies may be quickly and expediently removed. Similarly, nipple assemblies may be quickly and expediently coupled to available insert assemblies while the feed line is under pressure. These characteristics avoid facility efficiency lapses caused by non-functioning or unusable feeding nipples which are left coupled to the feed line, or by line depressurizations required to remove nipple assemblies or bring others online. As a result, feed lines are always operational, and the ratio of operational feeding stations to livestock is always maximized. In addition, feeding nipples may be selectively coupled to the feed lines only where they are needed, in order to limit feed usage. This has the further advantage of reducing the amount of equipment a facility must purchase.

The ability to customize fluid flow rate at each feeding station allows a facility to use a single feeding station for a wide variety of sizes and species of livestock. This reduces operational complexity related to installing and replacing nipple assemblies, and also reduces the number and types of nipple assemblies that must be purchased. Livestock stalls can be built in a "one-feeder-fits-all" fashion, and livestock need not be transferred to other stalls throughout the course of their growth on account of incompatible feeding stations.

Some embodiments of the present invention provides a quick connect-disconnect livestock feed dispensing apparatus attachable to a pressurized feed line 320 that includes an insert assembly 101 and a nipple assembly 201. FIG. 1A shows an embodiment of the insert assembly 101 which includes a body 110, an O-ring 116, a sealing sphere 112, a compressible member such as spring 114, and a spring retaining means 120. FIG. 1B shows an exploded view of the same. The insert assembly body 110 defines a fluid passageway 130 having an outlet end 129 and an inlet end 128, and stopping means, such as an annular shoulder 132 which extends radially inward within the fluid passageway 130 between the inlet end 128 and outlet end 129. The stopping means 132 has a top face 135 and a sealing surface 134 and creates a reduced-diameter point 133 within the fluid passageway 130, which may be adjusted to control fluid flow rate and fluid turbidity, or to accommodate for solid particulate within the fluid. The reduced-diameter point 133 may also be adjusted based on the diameter of the sealing means, such as sealing sphere 112, the size and shape of the compressible spring 114, the size and shape of the O-ring 116, or other factors. In some embodiments the annular shoulder 132 forms a sealing face 134 parallel with a diameter of the fluid passageway 130 and faces the inlet end 128.

In other embodiments, one or more of the sealing face or annular shoulder extend inward at an angle to the diameter of the fluid passageway. In other embodiments, the stopping means is not fully annular, and comprises one or more pegs, posts, protrusions, or the like, suitable for accepting and stopping a sealing means. In such embodiments, the one or more stopping means can be configured to accept an O-ring. The O-ring 116, when present in some embodiments to enhance sealing capabilities of the insert assembly 101, is sealingly in contact with the annular shoulder 132 sealing face 134 facing the inlet end 128, and creates a substantially liquid-tight seal when in contact with the sealing sphere 112. In some embodiments containing an O-ring, the stopping means may be a series of pegs, bars, or other means suitable for supporting an O-ring, which extend radially inward within the fluid passageway.

The O-ring 116 may have a square, circular, or ovular cross section. In some embodiments the O-ring 116 may have a substantially right-triangular or slanted cross section, with one edge running along the sealing face 134, one edge running downward towards the inlet end 128 along the outer wall of the fluid passageway 130, and a third edge running between the two. Such a contour aids in guiding the sealing sphere 112 into its preferred sealing orientation, or closed position 310 as shown in FIG. 3B, if high fluid pressure, fluid turbidity, or other factors dislodge the sealing sphere 112 from its ideal, axially-centered position within the body 110. A guiding O-ring 116 as described allows for sealing sphere 112 size to be reduced to improve fluid flow through the insert assembly 101 without detrimentally affecting sealing reliability.

The sealing sphere 112 is guided into sealing contact with the annular shoulder 132 or O-ring 116 by the compressible spring 114 and is maintained within the fluid passageway 130 by a retaining means 120 located proximate to the inlet end 128 of the body 110. The compressible spring 114 shape may be cylindrical or conical, and may have coils which are closely or widely spaced. In many embodiments the compressible spring 114 is axially centered. Spring shape and coil spacing may be used to reduce fluid flow resistance and clogging, especially for fluids having higher viscosities or solid particulate content. Larger coil diameters may also be used to more effectively contact the sealing sphere 112. Wider spaced coils minimize particulate clogging within the coils. In some embodiments having cylindrical springs, the spring diameter is smaller, and fluid flows between the outside of the spring coils and the inner periphery of the fluid passageway 130. In some such embodiments, the spring diameter is larger, sometimes approaching the diameter of the fluid passageway 130, and fluid flows inside the spring coils. In other such embodiments, fluid flows both inside the spring coils and outside the spring coils.

In some embodiments having conical springs, the smaller-diameter end of the spring is positioned nearest the sealing sphere 112. In other such embodiments, the larger-diameter end of the spring is positioned nearest the sealing sphere 112, and fluid flows between the outside of the spring coils and the inner periphery of the fluid passageway 130. In some such embodiments the fluid flows both inside the spring coils and outside the spring coils.

In some embodiments, the retaining means 120 may include a washer 121 having sufficient surface area to retain the compressible spring and an internal retaining ring 122 which snaps into a receiving groove 123 on the periphery of the fluid passageway 130. In other embodiments, the retaining means 120 may include an annular shoulder extending radially inward within the fluid passageway and located proximate the inlet end 128. In other embodiments, the retaining means contact the compressible spring 114 proximate to the axial center of the fluid passageway 130.

The compressible spring 114, sealing sphere 112, optional O-ring 116 and annular shoulder 132 form a valve means within the insert assembly which is normally maintained in a closed position 310 as shown in FIG. 3B. In some embodiments the sealing sphere 114 may have a cylindrical shape, having a diameter equal to or less than the diameter of the fluid passageway 130 sufficient to enable axial movement within the fluid passageway 130. A cylindrical sealing sphere 114 alternative may have one or more holes, arranged in a circular pattern concentric with the fluid passageway 130 and aligned with the O-ring 116 or annular shoulder 132 sealing face 134.

In some embodiments the outer diameter of the insert assembly 101 inlet end 128 is less than the outer diameter of the insert assembly 101 outlet end 129. In other such embodiments the outer diameter of the insert assembly 101 inlet end 128 is greater than the outer diameter of the insert assembly 101 outlet end 129. In other such embodiments the outer diameter of the insert assembly 101 inlet end 128 is equal to the outer diameter of the insert assembly 101 outlet end 129.

In some embodiments the inner diameter of the fluid passageway 130 of the insert assembly 101 inlet end 128 is less than the inner diameter of the fluid passageway 130 of the insert assembly 101 outlet end 129. In other such embodiments the inner diameter of the fluid passageway 130 of the insert assembly 101 inlet end 128 is greater than the inner diameter of the fluid passageway 130 of the insert assembly 101 outlet end 129. In other such embodiments the inner diameter of the fluid passageway 130 of the insert assembly 101 inlet end 128 is equal to the inner diameter of the fluid passageway 130 of the insert assembly 101 outlet end 129.

Figure 8D:
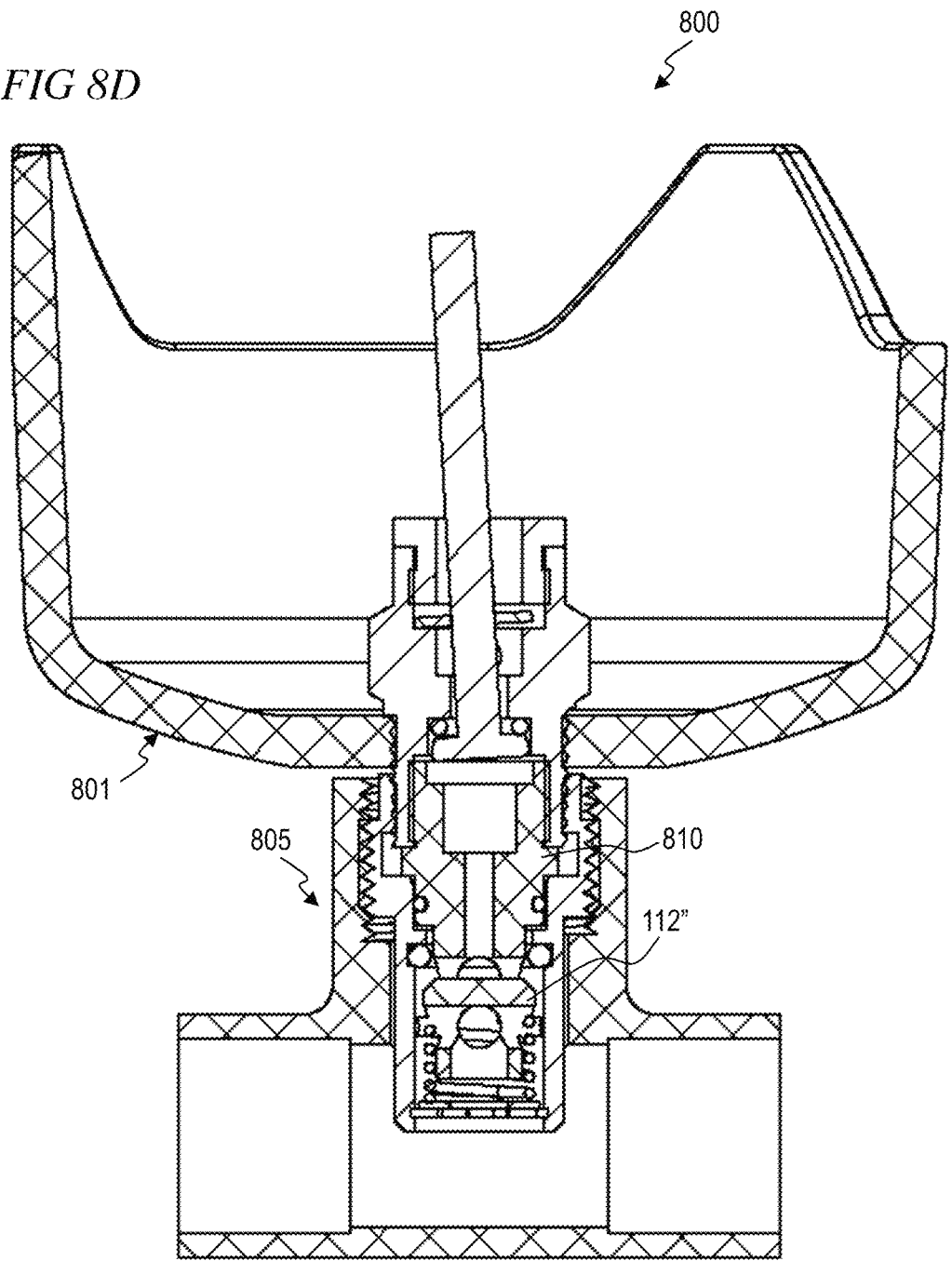
FIG. 8D illustrates a cross-sectional view of a feeding station, according to one or more embodiments generally corresponding to the embodiment illustrated in FIG. 7A.

FIG. 1C and FIG. 1D illustrate sealing means 112' which can act as an alternative to a sealing sphere 112. Sealing means 112' can comprise a body having a sealing face 112'A which can contact an O-ring 116 and/or sealing face 134 to effect a seal. Sealing mean 112' can further comprise a beveled or angled face 112'B which can effect a seal with O-ring 116 and/or sealing face 134. In some embodiments, angled face 112'B can effect a seal with O-ring 116 and/or sealing face 134 in combination with sealing face 112'A. In some embodiments, sealing means 112'B body is formed such that a smaller diametered portion 112'C is positionable within the coils of a spring, such as spring 114, and larger diametered portion 112'D is sized in order to rest on the upper portion of spring 114. This positioning is illustrated in FIG. 8D. FIGS. 1E-G illustrate sealing means 112", which elaborates upon sealing means 112' through the addition of an internal axial fluid passage 160 in fluid communication with one or more radial fluid passages 165. Such an embodiment allows fluid to flow through the center axial fluid passage 160 of sealing means 112" and out through the one or more radial fluid passages 165. The one or more radial fluid passages 165 are positioned such that at least a portion of the passage cross section is unobstructed by spring 114 (shown in FIG. 8D), thereby providing a fluid passage around a spring, rather than through the coils of a spring. Such an embodiment can be useful for compact designs and/or those facilitating the flow of particulate-laden fluids, among others. FIGS. 1H-I show alternate insert assembly body 110' embodiments which include, among other things, a wrench-receiving contour 150'.

FIG. 2A shows an embodiment of the nipple assembly 201 which includes a body 210, a cup 226, an O-ring 216, a nipple 212, and a compressible spring 214. The nipple assembly body 210 defines a fluid passageway 230 having an outlet end 229 and an inlet end 228, and includes a stopping means, such as annular shoulder 232 which extends radially inward within the fluid passageway 230 between the inlet end 228 and outlet end 229, a tip 224 which extends beyond the inlet end 228, and a locking member 211. The cup 226 attaches to the outside of the body 210 between the inlet end and outlet end, and is concave up towards the outlet end 229.

The annular shoulder 232 creates a reduced-diameter point 233 within the fluid passageway 230, which may be adjusted to control fluid flow rate and fluid turbidity. The reduced-diameter point 233 may also be adjusted based on the size and shape of the compressible spring 214, the size and shape of the O-ring 216, the size and shape of the nipple 212, or other factors. In some embodiments the annular shoulder 232 forms a sealing face 234 parallel with a diameter of the fluid passageway 230 and faces the inlet end 228. In other embodiments, one or more of the sealing face or annular shoulder extend inward at an angle to the diameter of the fluid passageway. In other embodiments, the stopping means is not fully annular, and comprises one or more pegs, posts, protrusions, or the like, suitable for accepting and stopping a sealing means. In such embodiments, the one or more stopping means can be configured to accept an O-ring. In some embodiments, the annular shoulder is part of a nipple retaining means 231 as shown in FIG. 2A, and may be employ an O-ring 217 to enhance sealing capabilities between the nipple retaining means 231 and nipple assembly 201 body 210.

The nipple 212 includes an elongated stem 235 with a base 213, the elongated stem 235 extending towards the outlet end 229 through the reduced diameter point 233 formed by the annular shoulder 232 and the base 213 located between the annular shoulder 232 and the inlet end 228. The nipple 212 base 213 is guided into sealing contact with the annular shoulder 232 sealing face 234 or O-ring 217 by the compressible spring 214 located within the fluid passageway 230 between the inlet end 228 and the annular shoulder 232. In some embodiments, the bottom outer edge 242 of the nipple 212 base 213 is beveled or rounded to allow for better fluid flow within the fluid passageway 230. In some embodiments, the nipple 212 or nipple base 233 can partially position one or more of within or around the spring coils. Such an orientation allows the spring 114 aligned or in contact with the nipple.

The compressible spring 214 shape may be cylindrical or conical, and may have coils which are closely or widely spaced. In many embodiments the compressible spring 214 is axially centered. Spring shape and coil spacing may be used to reduce fluid flow resistance and clogging, especially for fluids having higher viscosities or solid particulate content. Larger coil diameters may also be used to more effectively contact the sealing sphere 212. Wider spaced coils minimize particulate clogging within the coils. In some embodiments having cylindrical springs, the spring diameter is smaller, and fluid flows between the outside of the spring coils and the inner periphery of the fluid passageway 230. In some such embodiments, the spring diameter is larger, sometimes approaching the diameter of the fluid passageway 230, and fluid flows inside the spring coils. In other such embodiments, fluid flows both inside the spring coils and outside the spring coils.

In some embodiments having conical springs, the smaller-diameter end of the spring is positioned nearest the sealing means 112. In other such embodiments, the larger-diameter end of the spring is positioned nearest the sealing means 112, and fluid flows between the outside of the spring coils and the inner periphery of the fluid passageway 230. In some such embodiments the fluid flows both inside the spring coils and outside the spring coils.

In some embodiments, the insert assembly 101 does not comprise a compressible member such as spring 114. In other embodiments, nipple assembly 201 does not comprise a compressible member such as spring 214. In one or more of these embodiments, fluid pressure maintains one or more of the sealing means 112 and the nipple 212 in a substantially sealed position.

In some embodiments, for example as shown in FIG. 2B, the nipple 212 stem 235 is tapered between the base 213 and the end 236. In some such embodiments the nipple 212 stem 235 has multiple tapered segments wherein the stem 235 diameter increases from converging axial directions to form a maximum diameter point or a ridge 237. In other such embodiments the diameter increases only from the nipple 212 base 213 to form the ridge 237.

The O-ring 216, when present in some embodiments to enhance sealing capabilities of the nipple assembly 201, is sealingly in contact with the annular shoulder 232 sealing face 234 facing the inlet end 228, and creates a substantially liquid-tight seal when in contact with the nipple 212 base 213.

The force required to actuate the nipple 212 can be controlled by the type of spring used and the extent to which the spring is compressed while the nipple 212 base 213 is seated in a closed position as shown in FIG. 2A.

In some embodiments, the nipple assembly 201 body 210 is telescopic between the annular shoulder 232 and the inlet end 228 to accommodate feeding livestock of differing heights. In some such embodiments, telescoping the nipple assembly 201 body 210 adjusts the extent to which the compressible spring 214 is compressed, and allows the nipple 212 actuation force to be adjusted. In other such embodiments, telescoping the nipple assembly 201 body 210 does not adjust the extent to which the compressible spring 214 is compressed.

Figure 3B:
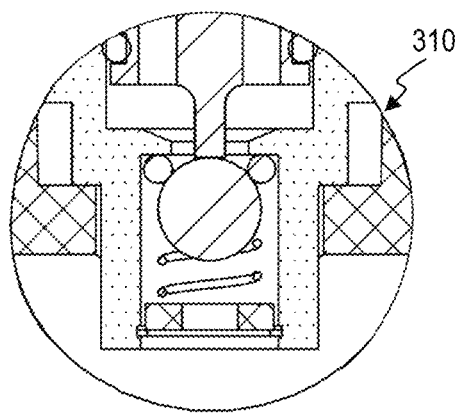
FIG. 3B illustrates a cross-sectional side view of a nipple assembly partially coupled to an insert assembly, the latter in a closed position, according to one or more embodiments.

The insert assemble 101 may be mechanically attached to the pressurized feed line 320 at a T-junction 321, or may be a permanent fixture of the line 320 as shown in FIG. 3A. The insert assembly 101 may be mechanically attached using adhesives, solder, welding, or other suitable means. In some embodiments the outer surface 138 of insert assembly 101 is threaded and may be accepted by an appropriately sized T-junction 321 having female threads. In other embodiments, the outer surface 138 of insert assembly 101 may have a wrench-receiving contour. In some such embodiments, the wrench-receiving contour is located between the outlet end 129 and the threaded outer surface 138. A wrench-receiving contour can include one or more notches 150' as shown in FIG. 1I. In other embodiments, insert assembly 101 includes one or more tool-receiving notches 150 used for screwing the nipple assembly 101 into position. Tool-receiving notches 150' and wrench receiving contours can collectively be referred to as tool-receiving contours. When the insert assembly 101 inlet end 128 is in fluid communication with the pressurized feed line 320, the internal valve system of the insert assembly prevents discharge of the pressurized line fluid.

Figure 3C:
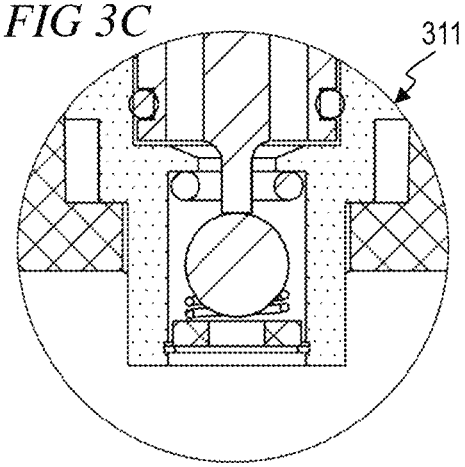
FIG. 3C illustrates a cross-sectional side view of a nipple assembly coupled to an insert assembly, the latter in an open position, according to one or more embodiments.

The outlet end 129 of the insert assembly 101 is able to accept the inlet end 228 of the nipple assembly 201, which causes the nipple assembly tip 224 to contact and unseat the insert assembly 101 sealing sphere 112 from a closed position 310 as shown in FIG. 3B to an open position 311 as shown in FIG. 3C. Fluid flow is then allowed through the fluid passageway 130 of the insert assembly and into the inlet end 228 of the nipple assembly 201. In some embodiments, nipple insert assembly 101 includes an inner surface 139 which may be threaded to accept a threaded outer surface 238 of the nipple assembly 201. Nipple assembly 201 may include an O-ring 218 to enhance sealing capabilities between nipple assembly 201 body 210 and the inner surface 140 of the insert assembly 101 Inner surface 140 is advantageously designed to seal against O-ring 218 at variable insertion depths of nipple assembly 201 into insert assembly 101, thereby effecting a constant seal even when the insertion depth of nipple assembly 201 into insert assembly 101 is adjusted.

The internal valve system created by the nipple 212, compressible spring 214, annular shoulder 232 and optionally the O-ring 216 of the nipple assembly 201 substantially prevents discharge of the pressurized line 320 fluid. The nipple 212 may be actuated with a force 240 directed radially inward, a force 241 axially downward towards the nipple base 213, or a combination thereof. Actuating the nipple 212 unseats the nipple base 213 and allows fluid flow through the fluid passageway 230 of the nipple assembly 201, past the nipple base 213, through the reduced-diameter point 233, out the outlet end 229, and into the collection zone 227 of the cup 226. Often the nipple 212 will be actuated by an animal's head, but it is possible that livestock may use other appendages to actuate the nipple 212. A helpful facility employee may also actuate the nipple 212 to aid an animal in feeding or to demonstrate operating procedure to the livestock.

Figure 5A:
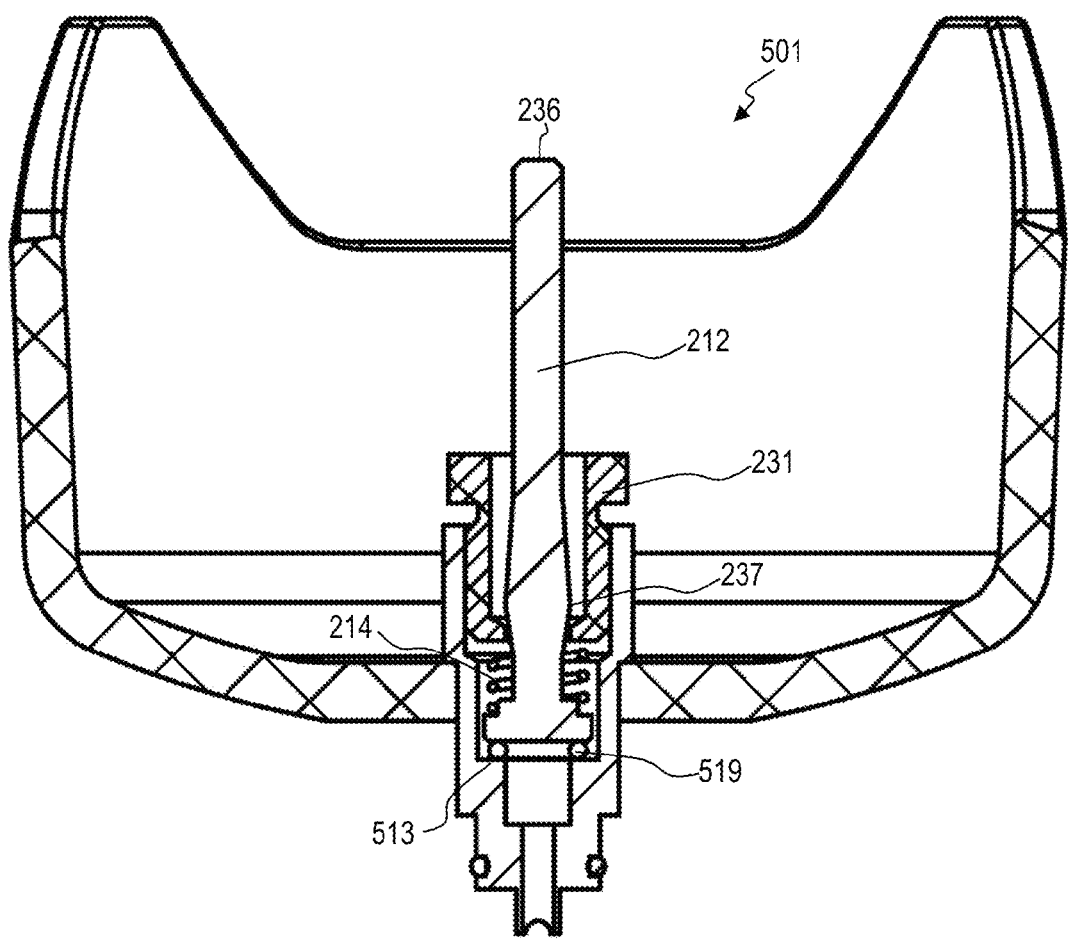
FIG. 5A illustrates a cross-sectional side view of a nipple assembly having a tapered nipple and a spring element oriented above the nipple base, according to one or more embodiments.
Figure 5B:
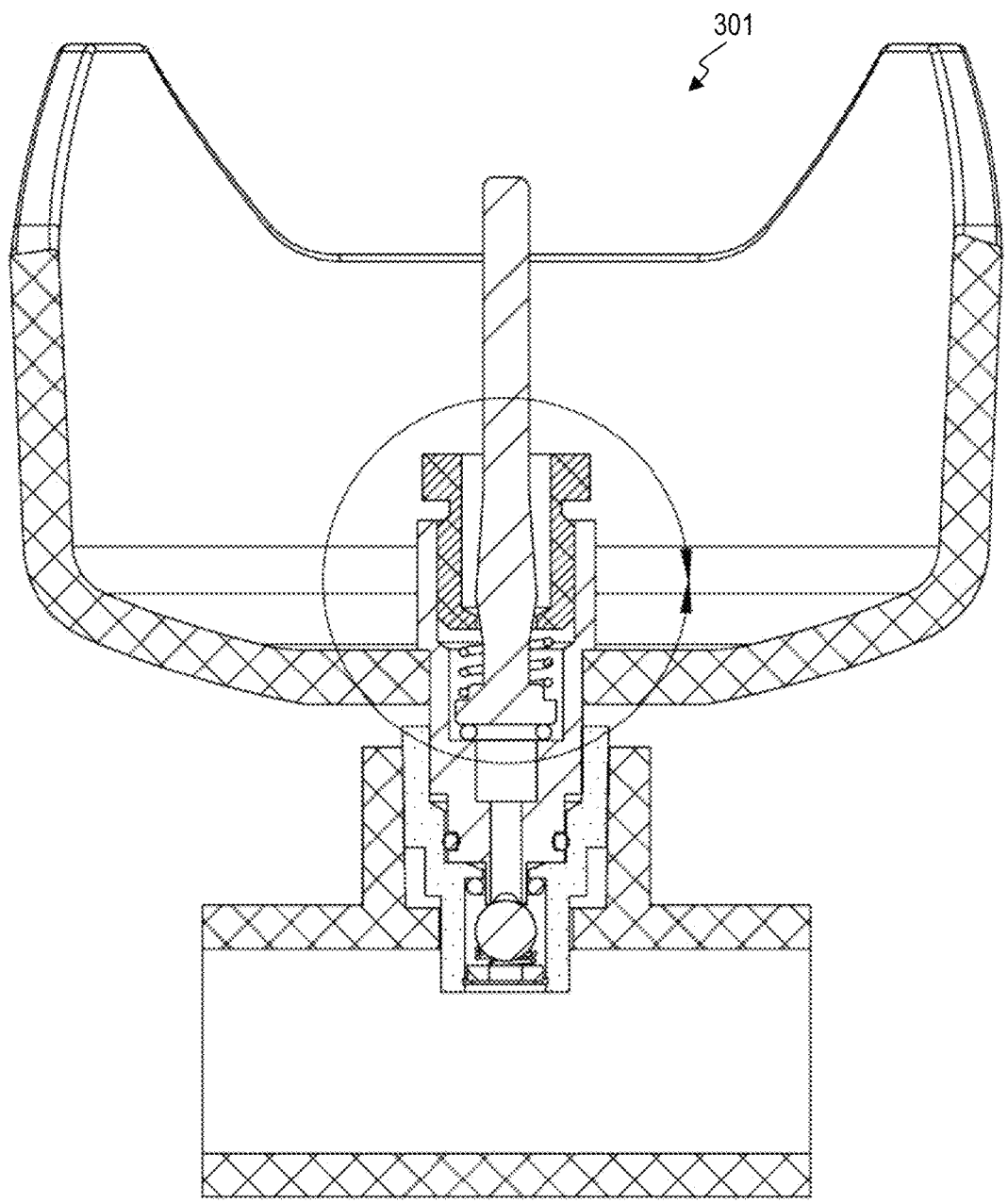
FIG. 5B illustrates a cross-sectional side view of a complete feeding station, according to one or more embodiments generally corresponding to the embodiment illustrated in FIG. 5A.

In other embodiments, as shown in FIG. 5A, a nipple assembly 501 may position the compressible spring 214 between the nipple 212 base 213 and the nipple retaining means 231. In such embodiments the nipple 212 base 213 is guided into sealing contact with a sealing face 513 by the compressible spring 214. The sealing surface 513 may be formed by an annular shoulder extending radially inward from the periphery of the fluid passageway 230, an increased fluid passageway 230 diameter, or a combination thereof. In some embodiments an 0-ring 519 is present to enhance sealing capabilities between the nipple 212 base 213 and the sealing surface 513.

FIG. 6A-H and FIG. 7A-E show various embodiments for the nipple assembly body 210. FIG. 6A-H shows various embodiments wherein fluid flows through one or more holes 610 located on the inlet end 228 and surrounding the nipple assembly 201 tip 224. FIG. 7A-E shows various embodiments wherein fluid flows through the nipple assembly 201 tip 224. The nipple assembly 201 tip 224 may include holes, notches, or a combination thereof, through which fluid may flow. In some embodiments, the nipple assembly may contain a combination of one or more holes 610 and a tip 224 having notches, holes, or a combination thereof.

FIGS. 8A-C illustrate an embodiment for a nipple assembly body 810 which replaces tip 224 of nipple assembly body 210 with one or more tips 820 which circumferentially surround a central hole 815. Tips 820 extend beyond the body 810 leaving peripheral recesses 825 through which fluid can flow into central hole 815. FIG. 8D illustrates a feeding station 800 comprising a nipple assembly 801 and insert assembly 805. Nipple assembly 801 comprises nipple assembly body 810. Spring elements are omitted from nipple assembly 801 for clarity. Insert assembly 805 comprises sealing means 112". Body 810 can be advantageously combined with any features described herein; in particular, body 810 can be combined with aspects described in FIGS. 6A-H, and FIGS. 7A-E.

Maximum flow rate of fluid discharged from a feeding station is controlled in two ways. First, the nipple's 212 range of motion range of motion may be limited, which limits the maximum flow rate of discharged fluid when actuated. Diameter of the elongated stem 235, diameter of reduced diameter point 233, compressible spring 214 height and compressibility, and nipple 212 base 213 size and shape may all be designed to control range of motion of the nipple 212. As shown in FIG. 2A, in some embodiments the nipple retaining means 231 acts as a nipple motion restrictor. In other embodiments, the nipple motion restrictor may be separate from the nipple retaining means 231, and may be inserted between the nipple 212 and the inner wall of the fluid passageway 230 or between the nipple 212 and the inner wall of the nipple retaining means 231. In some such embodiments the inner wall of the fluid passageway 230 or the nipple retaining means 231 is threaded to receive the nipple motion restrictor. The nipple motion restrictor contains an inner bore which may be substantially cylindrical or conical. In some embodiments having a substantially cylindrical nipple 212 stem, inserting the nipple motion restrictor 231 deeper into the fluid passageway 230 away from outlet end 229 increases nipple 212 range of motion and allows for higher discharge flow rates to be achieved when actuated. In some embodiments the nipple retaining means 231 and nipple motion restrictor are the same element.

In some other embodiments, as shown in FIG. 2B, and 5A-5E, the nipple 212 is tapered. FIG. 5C shows the nipple retaining means 231 and tapered nipple 212 oriented in a fully closed position 501. Inserting the nipple retaining means 231 deeper into the fluid passageway 230 away from the outlet end 229 provides increased nipple 212 mobility 502 and maximum nipple 212 mobility 503, as shown in FIG. 5D and FIG. 5E, respectively.

Second, maximum fluid discharge flow rate may be controlled by manipulating the gap between the sealing sphere 112 and the annular shoulder 132 or O-ring 116, when in the open position 311 as shown in FIG. 3C. Said gap is a function of tip 224 length, annular shoulder 132 thickness 136, O-ring 116 thickness, O-ring 116 cross-sectional shape, and proximity of the inlet end 228 of the nipple assembly 201 to the top face 135 of the annular shoulder 132. In practice, the gap between the sealing sphere 112 and the annular shoulder 132 or O-ring 116 is directly proportional to insertion depth of the nipple assembly 201 into the insert assembly 101. Different embodiments contain different tip 224 lengths, annular shoulder 132 thicknesses 136, O-ring 116 thicknesses, and O-ring 116 cross-sectional shapes. In some such embodiments, the tip 224 length is adjustable. In other such embodiments, the proximity of the inlet end 228 of the nipple assembly 201 to the top face 135 of the annular shoulder 132 may be manually or automatically adjusted to adjust flow rate.

In some embodiments, the outer surface 238 of the nipple assembly 201 and the inner surface 139 of the insert assembly 101 may be threaded. In other such embodiments one or more spring loaded pins may protrude from outer surface 238 of the nipple assembly 201 and may lock into holes located on the inner surface 139 of the insert assembly 101. In some such embodiments, a locking member 211 may be located on the outer surface 238 of nipple assembly 201 body 210. The nipple assembly 201 may be inserted into insert assembly 101 and adjusted to a depth which achieves a desired maximum fluid discharge flow rate, and locked in place by screwing the locking member 211 into contact with the insert assembly 101 top surface 141. In other such embodiments tip 224 length may be adjustable. Additionally, in some other embodiments, outer surface 238 may contain marking useful for indicating insertion depth of nipple assembly 201 into insert assembly 101. The distance from the tip 224 to surface 225 can be used to control insertion depth to vary discharge flow. In these embodiments, locking member 211 would be optional, and contact between surface 225 and surface 141 could be relied upon to control discharge flow.

In some embodiments locking member 211 can act as a flow rate metering component, by controlling the depth to which a nipple assembly is inserted into an insert assembly. Locking member 211 can be movable in directions between the inlet end 228 and outlet end 229 of nipple assembly 201. In other embodiments, notches, grooves, or designated locking member 211 positions can indicated locking member 211 positions associated with particular or calibrated flow rates.

The ability to control the fluid flow rate of each feeding station essentially embodies a "one-size-fits-all" livestock feeding apparatus, which can be used for a wide variety of livestock having different feeding requirements. This obviates the need to buy many different styles of feeding apparatus, streamlines maintenance and operating procedures, and decreases facility size by enabling a plurality of livestock species and sizes to feed from the same feeding station. Additionally, nipple assembly 201 and insert assembly 101 may be designed for use with a variety of feed fluids having varying viscosities and solid particulate content and sizes.

Once the nipple 212 is actuated, the discharged fluid collects in the cup 226 where it may be consumed by livestock. The cup 226 depth and shape may be customized based on livestock size, age, species, or other characteristics, to allow for easier feeding. The cup 226 may be designed to accommodate one or more feeding animals. Collectively, the cup 226, insert assembly 101 and nipple assembly 201 constitute a feeding station 301 as shown in FIG. 3A. A feeding station 301 my include a single cup 226 that encompasses a plurality of nipple assemblies 201 coupled to corresponding insert assemblies 101 which are attached to a pressurized feed line 320. In such an embodiment the plurality of nipple assemblies 201 may be individually actuated and the discharged fluids can collect in the same collection zone 227 of the single cup 226.

Removing the nipple assembly from the insert assembly breaks contact between the nipple assembly 201 tip 224 and the sealing sphere 112, and allows the sealing sphere 112 to reseat into a closed position 310 as shown in FIG. 3B, preventing further fluid discharge from the pressurized feed line 320.

Figure 9:
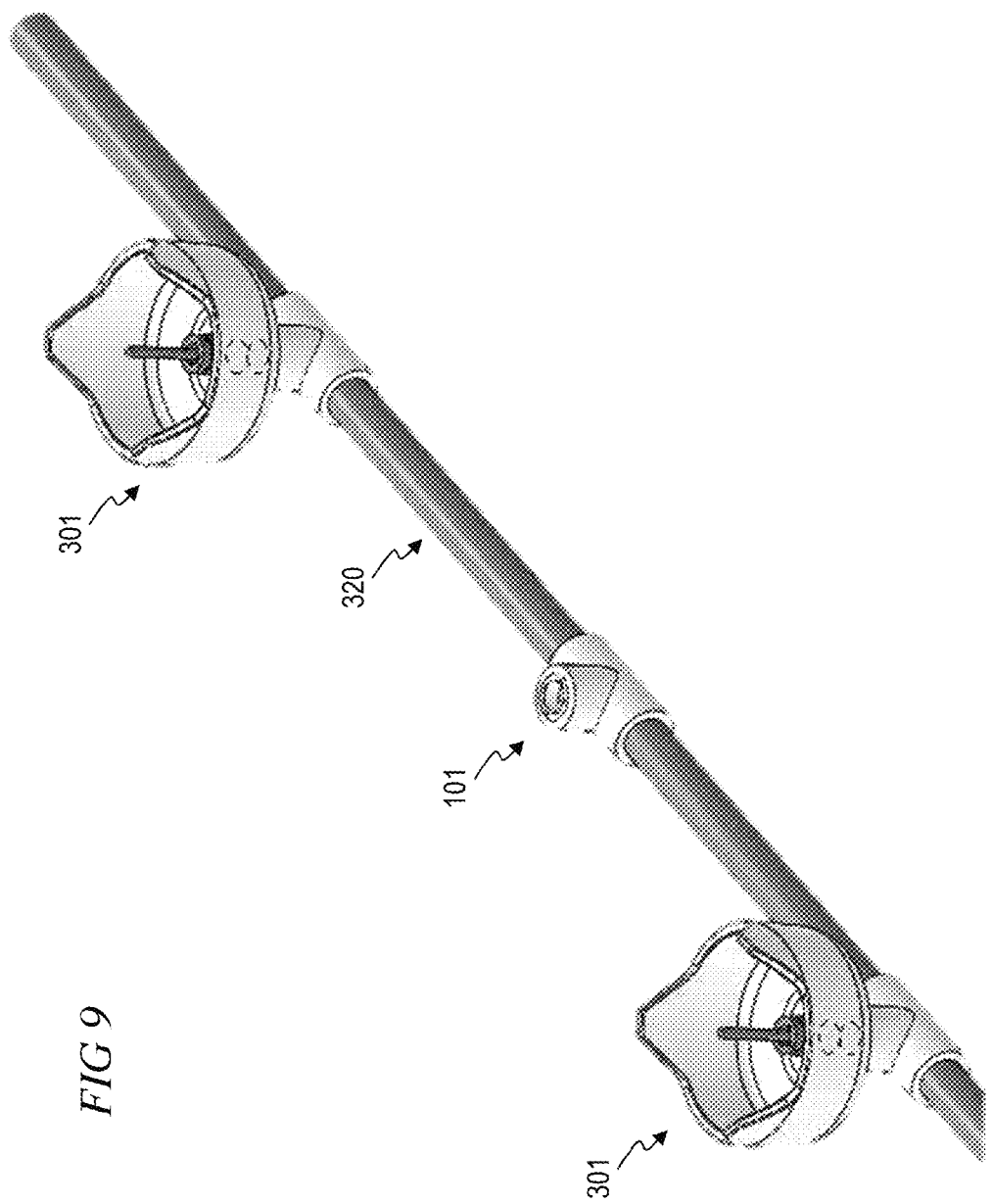
FIG. 9 illustrates a perspective view of a pressurized line containing a combination of complete feeding stations and insert assemblies mated to T-junctions, according to one or more embodiments.

Systems in accordance with aspects of the present invention may include attaching a plurality of insert assemblies 101 to at least one pressurized feed 320 line to create a series of feeding access points. Nipple assemblies 201 may be coupled to corresponding insert assemblies 101, enabling a plurality of livestock to simultaneously feed. Any number of feeding stations 301 may be removed for maintenance, cleaning, replacement, or to limit the number of available feeding stations. The internal valve system of the insert assembly 101 allows such removals to be made while the feed line 320 is pressurized and without disturbing feeding activity at other feeding stations, such as in FIG. 9.

During device operation, the depth to which the nipple assembly 201 is inserted into the insert assembly 101 controls the maximum flow rate allowable through the feeding station 301. Insertion depth of nipple assembly 201 into insert assembly 101 may be controlled and manipulated by electric, hydraulic, pneumatic, or other similar or applicable means. One or more feeding stations may be linked to a central control system, wherein an operator may manually manipulate the insertion depths of any feeding station. Insertion depths may also be manipulated by a program or advanced control scheme. Process values such as feed line pressure, feed line flow rate, feeding station-specific pressure, feeding station-specific flow rate, other applicable process values, or a combination thereof may be used by an operator, a program, or an advanced control scheme to manipulate and control insertion depths. In some embodiments, a feeding station 301 includes a scale, and insertion depth is manually or automatically manipulated using the feeding animal's weight as a control variable. Such an embodiment allows a single feeding station to be used by a variety of animals, such as a grown cow or a baby piglet, which may require different feeding flow rates.

The foregoing discussion discloses and describes merely exemplary embodiments of the present inventions. Upon review of the specification, one skilled in the art will readily recognize from such discussion, and from the accompanying figures and claims, that various changes, modifications and variations can be made therein without departing from the spirit and scope of the invention as defined in the following claims.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A modular livestock feed dispensing apparatus comprising:
　an insert assembly containing:
　　a body defining a first fluid passageway having
　　　a first inlet end,
　　　a first stopping component extending inward, and
　　　a first outlet end; and
　　a movable sealing component within the body; and
　a nipple assembly containing:
　　a body defining a second fluid passageway having
　　　a second inlet end, a second stopping component extending inward,
a second outlet end, and
a tip extending beyond the second inlet end and being fixed in relation to the second outlet end;
an actuating nipple having a base and being movable relative to the fixed tip; and
a spring biasing the nipple upwardly away from the fixed tip and toward the second stopping component,
wherein inserting the second inlet end of the nipple assembly into the first outlet end of the insert assembly causes the fixed tip of the nipple assembly to unseat the sealing component of the insert assembly into an open position, allowing fluid to pass through the first fluid passageway of the insert assembly into the nipple assembly body; wherein actuating the nipple compresses the spring and unseats the nipple base downwardly away from the second stopping component, allowing fluid to pass through the second fluid passageway of the nipple assembly; and wherein actuating the nipple does not cause the sealing component of the insert assembly to move within the body; and wherein removing the nipple assembly from the insert assembly allows the sealing component of the insert assembly to reseat into a closed position and substantially prevent any further fluid flow through the first fluid passageway of the insert assembly.

2. The apparatus of claim 1, wherein a gap between the sealing component and the first stopping component in the open position can be adjusted to control flow rate.

3. The apparatus of claim 1, wherein maximum flow rate may be controlled by adjusting an insertion depth of the nipple assembly into the insert assembly.

4. The apparatus of claim 1, wherein the nipple may be actuated by a force radially inward, a force axially downward toward the nipple base, or a combination thereof.

5. The apparatus of claim 1, wherein the nipple assembly tip comprises a central hole in fluid communication with the fluid passageway of the nipple assembly.

6. The apparatus of claim 1, wherein the nipple assembly tip further comprises holes, notches, or peripheral recesses.

7. The apparatus of claim 1, further comprising a fluid-receiving cup.

8. The apparatus of claim 1, wherein the sealing component is spherical.

9. The apparatus of claim 1, wherein the insert assembly comprises a first compressible member and the nipple assembly comprises a second compressible member.

10. The apparatus of claim 9, wherein one or both of the first compressible member and second compressible member has a cylindrical or conical shape.

11. The apparatus of claim 9, wherein the sealing component comprises a smaller diametered portion positionable within the first compressible member.

12. The actuating nipple base of claim 1, further comprising a bottom outer edge which may be a corner, rounded, or beveled.

13. The apparatus of claim 1, wherein the nipple stem is tapered.

14. The apparatus of claim 1, wherein the nipple assembly and insert assembly attach via a threaded fitting.

15. The apparatus of claim 1, wherein one or both of the insert assembly body and the nipple assembly body further comprise a tool-receiving contour.

16. The apparatus of claim 1, wherein the sealing component comprises a spherical sealing face.

17. A modular livestock feed dispensing apparatus comprising:
an insert assembly comprising:
a body defining a first fluid passageway and having a first inlet end, a first outlet end, and a sealing component movable within the body to control fluid into the first fluid passageway; and
a nipple assembly comprising:
a body defining a second fluid passageway and having a second inlet end, a second outlet end, and a fixed tip extending beyond the second inlet end;
an actuating nipple, with said nipple being movable relative to the fixed tip to control fluid flow into the second fluid passageway; and
a spring biasing the nipple upwardly away from the fixed tip,
wherein inserting the second inlet end of the nipple assembly into the first outlet end of the insert assembly causes the fixed tip of the nipple assembly to unseat the sealing component of the insert assembly into an open position, allowing fluid to pass through the first fluid passageway of the insert assembly into the nipple assembly body, wherein actuating the nipple compresses the spring and unseats the nipple downwardly toward the fixed tip, allowing fluid to pass through the second fluid passageway of the nipple assembly, and wherein said actuating the nipple does not cause the sealing component of the insert assembly to move within the body, and wherein removing the nipple assembly from the insert assembly allows the sealing component of the insert assembly to reseat into a closed position and substantially prevent any further fluid flow through the first fluid passageway of the insert assembly.

18. The modular livestock feed dispensing apparatus of claim 17 wherein said nipple has an elongated stem with a base, and the spring engages the base of the nipple.

19. The apparatus of claim 17, wherein a gap between the sealing component and a first stopping component extending inward of the insert assembly body in the open position can be adjusted to control flow rate.

* * * * *